Oct. 14, 1958  F. F. KISHLINE ET AL  2,856,152
TURBINE WHEEL ASSEMBLY

Filed April 23, 1953  2 Sheets-Sheet 1

INVENTORS
FLOYD F. KISHLINE
HARRY F. WOOD
BY
Carl J. Barbee
ATTORNEY

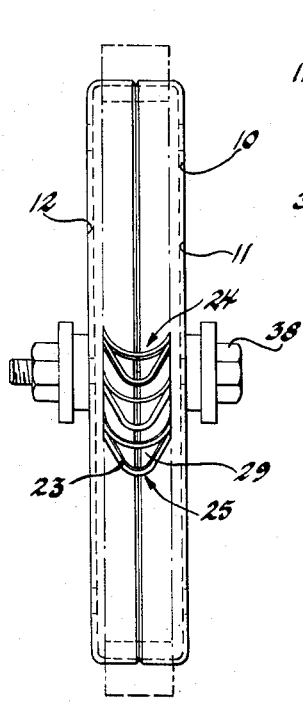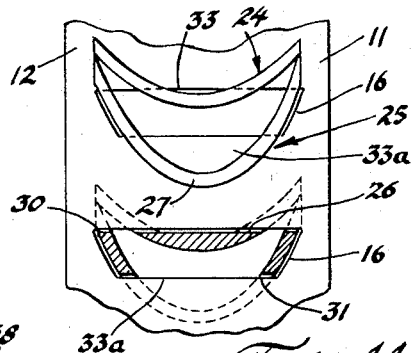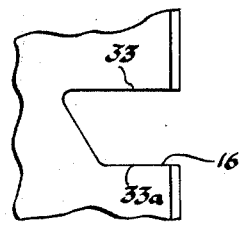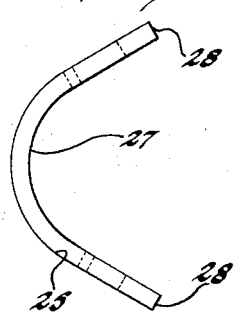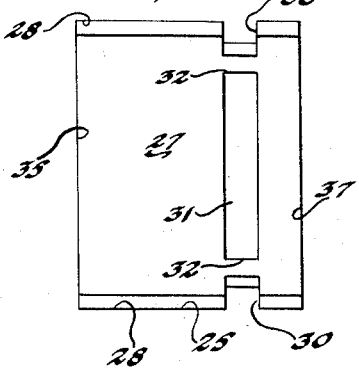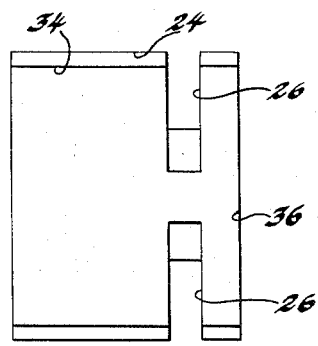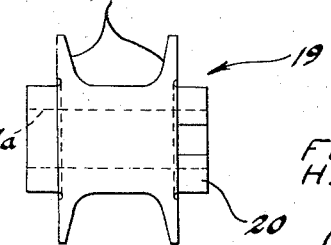

United States Patent Office 2,856,152
Patented Oct. 14, 1958

2,856,152
TURBINE WHEEL ASSEMBLY

Floyd F. Kishline and Harry F. Wood, Kenosha, Wis., assignors to American Motors Corporation, a corporation of Maryland Application April 23, 1953, Serial No. 350,698

3 Claims. (Cl. 253—39)

This invention relates to a high speed turbine wheel and method of manufacturing same.

It is an object of this invention to provide a turbine wheel for turbo-supercharging devices having improved characteristics of strength, rigidity, and simplicity of design.

A further object of this invention is to provide an improved method of manufacturing a turbine wheel for use with a turbo-supercharging device.

The construction and manufacture of high speed turbine wheels has heretofore been a very involved process. This is particularly true where efficiency in actual operation is of paramount importance. In many instances, the cost of specially designed machines to form each blade in a wheel where each blade forms an integral part of the wheel is very great. The forming of each blade has heretofore been complicated and has presented problems. The applicants herein have very ingeniously overcome the above difficulties in the manufacture and forming of a turbine wheel which forms the basis of the present invention.

The present invention is characterized by providing turbine blade assemblies, each comprising two parts and all formed separately from the body of the wheel itself. These blade assemblies are shaped to be individually arranged about and in spaced relation on the circumferential surface of the wheel body. After the blade assemblies are arranged in the wheel, all of the parts are processed through a brazing operation to secure the blade assemblies and wheel body in a unitary structure.

The invention possesses other objects and features of advantage, some of which with the foregoing, will be set forth in the following description of the preferred embodiment of the invention which is illustrated in the drawings accompanying and forming part of the specification. It is to be understood, however, that variations in the showing made by the said drawings and description may be adapted within the scope of the invention as set forth in the claims.

Referring to the drawings:

Figure 4 is an enlarged fragmentary view of a wheel member showing the particular shape of the blade assembly attaching slots.

Figure 5 is an end view of the rear half of the blade assembly.

Figure 6 is a plan view of the blade of Figure 5.

Figure 7 is an end view of the front half of the blade assembly.

Figure 8 is a plan view of the blade of Figure 7.

Figure 9 is a view of the hub member for spacing the opposed wheel members.

Figure 10 is a view similar to Figure 2 but showing how the turbine wheel assembly is secured prior to the brazing operation.

Figure 11 is a fragmentary detail plan view showing one blade assembly in full lines and another in section.

Figure 1:
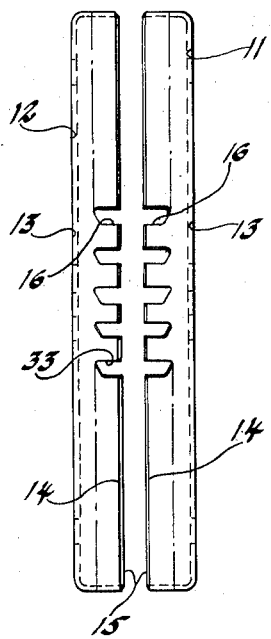
Figure 1 is a side view of the two opposed wheel members.

In general the turbine wheel identified generally by the numeral 10 comprises two substantially similar wheel blanks 11 and 12. Each blank includes a flat circular side wall 13 having an inwardly turned circumferential flange 14 integral therewith and at approximately right angles to its side wall. When the blanks are brought together with the circumferential flanges in abutment (as shown, for example, in Figure 2) then the composite structure forms a cylindrical drum with the circumferential flanges forming the circumferential rim of the drum.

Each flange 14 is provided with equally spaced notches 16 entirely around its circumferential surface and arranged inwardly from its free edge 15. Each blank is provided with an enlarged centrally disposed aperture 17 and a series of strategically spaced apertures 18 adjacent the flange. The two blanks are spaced apart by hub 19 when in assembled relationship. The hub 19 is provided at each end with cylindrical bearing members 20 and radially outwardly extending annularly flanges 21. One bearing portion is slotted at 22 to provide a keyway for receiving a driving key (not shown) in association with an impeller shaft (not shown).

Each turbine blade assembly is identified generally by the numeral 23 and includes the forward blade 24 and the rearward blade 25.

The forward blade 24 is arcuate throughout its height and is provided with off center and substantially oppositely disposed notches 26 in its side edges.

Figure 2:
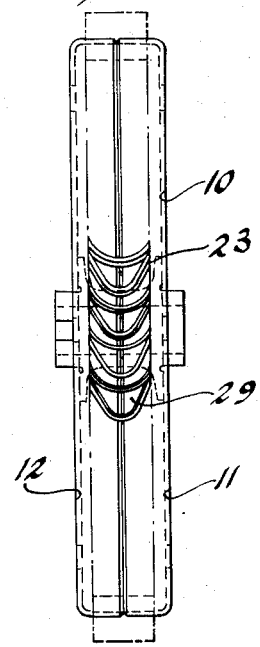
Figure 2 is a side view of the turbine wheel blanks with the blades assembled thereto.
Figure 3:
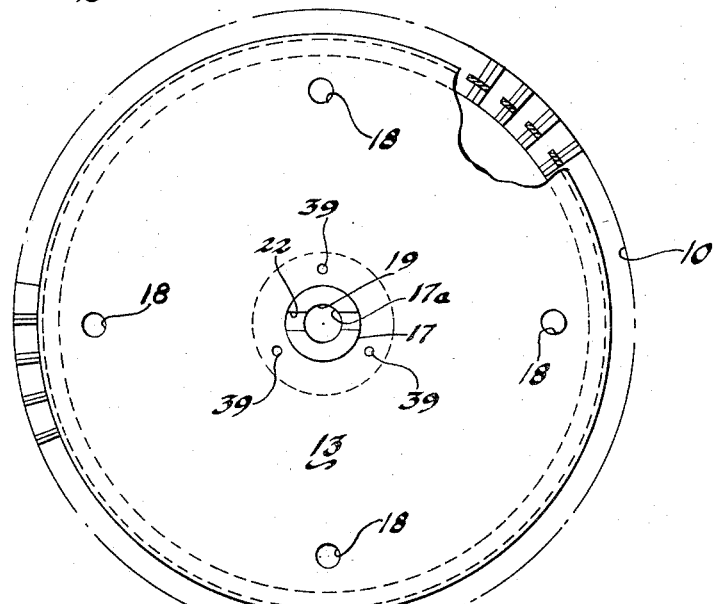
Figure 3 is a plan view of the turbine wheel with a fragmentary broken portion showing the blade assemblies in mounted position.

The rearward blade 25 has its central body portion arcuate throughout its height, its arc 27 being generated from a considerably shorter radius than the arc of blade 24 whereby its side edges 28 may bear on the curved rear face of turbine blade 24 and whereby a pocket, see Figures 2 and 9, of substantial proportions is obtained between the blades.

The blade 25 also includes a pair of oppositely disposed notches 30 formed in its side edges 28 with a horizontally and longitudinally extending slot 31 formed intermediate said notches 30 and separated only at each end by a portion of said blade material designated by the numeral 32.

The turbine wheel is assembled in the following manner. The blades are nested with the side edges 28 of the blade 25 resting on the curved rear face of the blade 24 and with the notches 26 and 30 in line with one another. The blade assembly is then inserted in the notch 16 in one of the turbine wheel blanks. Attention is directed to the fact that the longer ends 34 and 35 of the blades 24 and 25, respectively, are situated exteriorly of the rim 14 while the shorter ends 36 and 37 of the blades are situated beneath the rim and interiorly of the wheel.

Referring to Figure 11 it will be noted that the bridging portions 32 of blade 25 substantially span the width of the notch 16 and the side edges of such blade overhang the forward margin 33 of the notch and the arcuate portion 27 overhangs the rear margin 33a of said notch, whereas the side edges of blade 24 overhang the forward margin 33 while the bridging portion 24a is accommodated within the notch.

When all of the turbine blade assemblies have been arranged in the notches 16 of one wheel blank 11, such blank is placed on the hub 19 with its central aperture 17 receiving one end of the bearing 20 and the inside face of its side wall 13 resting on the outside surface of one of said flanges 21. When this has been done, the other wheel blank 12 is arranged over the turbine blade assemblies with each notch 16 in the blank 12 arranged over each assembly and the central aperture 17 in the second part 12 receiving the free end of the bearing 20 and the inside face of its side wall 13 bearing up against the outside surface of the other flange 21.

The two parts 11 and 12 and the turbine blade assemblies are held firmly together by inserting a headed stud 38 through the bore 17a of the hub, having a nut drawn tightly up against one end of said bearing 19. Other bolts may be inserted in aligned apertures 18 of each part 11 and 12 and drawn tightly against the side wall 13 of the wheel body 10. This insures a very tight connection of the parts 11 and 12 and the turbine blade assemblies.

A brazing material is then applied along the various connecting edges of the turbine blades, parts 11 and 12, bearing member 20, and the flat faces of the flanges 21. The whole turbine wheel assembly is then placed in a furnace having a temperature sufficiently high to thoroughly heat such brazing material whereby said material will secure all of the connecting parts together. The "notches" 16 in the circumferential flange of each wheel blank may be said to form "slots" in the resulting wheel rim.

Upon cooling, a turbine wheel assembly is provided with all the parts joined strongly together and with the turbine blade assemblies arranged in the spaced slots along the entire circumferential rim of the wheel body. Various apertures 39 are spaced about the bearing members 19 and assist in eliminating gases accumulated during the actual brazing operations.

It is believed that the construction, manipulation, utility, and advantages of this invention will now be apparent to those skilled in this art without a more detailed description thereof.

It will be apparent that changes in the details of construction, and in the combination and arrangements of parts may be resorted to without departing from the spirit and scope of the invention as hereinafter claimed or sacrificing any of its advantages.

Having described our invention, what we claim is:

1. A turbine wheel comprising: a generally cylindrical drum including sidewalls and a circumferential rim interconnecting the side walls, said rim having a series of circumferentially spaced slots therein, each slot being defined by a forward marginal edge, a rearward marginal edge and side edges; a blade assembly in each slot including a forward blade arcuate in cross section and having side edges each notched so that the side edges overhang the forward marginal edge of the rim slot and a rearward blade arcuate in cross section and having side edges each notched so that the side edges overhang the forward marginal edge of the rim slot, said rearward blade also having a notch in its rear wall so that said wall overhangs the rearward marginal edge of the rim slot.

2. A turbine wheel comprising: a generally cylindrical drum including sidewalls and a circumferential rim interconnecting the side walls, said rim having a series of circumferentially spaced slots therein, each slot being defined by a forward marginal edge, a rearward marginal edge and side edges; a blade assembly in each slot including a forward blade arcuate in cross section and having side edges each notched a generally common distance from the upper end of the blade so that the side edges overhang the forward marginal edge of the rim slot and a portion of said blade is situated above and the remaining portion of said blade is situated beneath the rim and a rearward blade arcuate in cross section and having side edges each notched a generally common distance from the upper end of the blade so the side edges overhang the forward marginal edge of the rim slot, said rearward blade also having a notch in its rear wall intermediate the side edge notches so that said wall overhangs the rearward marginal edge of the rim slot, a portion of the rearward blade being situated above the rim and the remaining portion being situated beneath the rim.

3. A turbine wheel as set forth in claim 2 wherein the arc of the rearward blade is generated from a radius shorter than that of the forward blade, whereby a pocket is formed between the rear face of the forward blade and the forward face of the rearward blade.

References Cited in the file of this patent

UNITED STATES PATENTS

| Number | Name | Date |
|---|---|---|
| 594,219 | Tredwell | Nov. 23, 1897 |
| 648,158 | Zoelly | Apr. 24, 1900 |
| 841,503 | Gelpke | Jan. 15, 1907 |
| 861,902 | Roesti | July 30, 1907 |
| 876,123 | Wilkinson | Jan. 7, 1908 |
| 1,005,736 | Wilkinson | Oct. 10, 1911 |
| 1,063,331 | Dake | June 3, 1913 |
| 1,101,645 | Ljungstrom | June 30, 1914 |
| 1,366,119 | Darling | Jan. 18, 1921 |
| 1,516,607 | Johanson | Nov. 25, 1924 |
| 1,551,342 | Steenstrup | Aug. 25, 1925 |
| 1,603,966 | Lorenzen | Oct. 19, 1926 |
| 1,829,179 | Back | Oct. 27, 1931 |
| 2,040,640 | Bedford | May 12, 1936 |
| 2,494,658 | Highberg | Jan. 17, 1950 |
| 2,628,066 | Lombard | Feb. 10, 1953 |